United States Patent [19]
Teremy et al.

[11] Patent Number: 5,974,274
[45] Date of Patent: Oct. 26, 1999

[54] PHOTOGRAPHIC CAMERA HAVING MAGNETIC RECORDING SYNCHRONOUS WITH PIEZOELECTRIC DRIVE

[75] Inventors: Paul Teremy, Rochester; Wayne E. Stiehler, Spencerport, both of N.Y.

[73] Assignee: Eastman Kodak Company, Rochester, N.Y.

[21] Appl. No.: 09/133,825

[22] Filed: Aug. 13, 1998

[51] Int. Cl.⁶ .................................................. G03B 17/24
[52] U.S. Cl. ........................................... 396/319; 396/418
[58] Field of Search ..................................... 396/319, 320, 396/387, 406, 411, 418; 310/328, 333; 318/116

[56] References Cited

U.S. PATENT DOCUMENTS 5,130,745  7/1992  Cloutier et al. .
5,467,158  11/1995  Murashima et al. ................. 396/411 X
5,475,455  12/1995  Hibino et al. .
5,555,048  9/1996  Oldfield .

*Primary Examiner*—Howard B. Blankenship
*Attorney, Agent, or Firm*—Thomas H. Close

[57] ABSTRACT

A photographic camera uses photographic film of the type having a magnetic recording layer. The camera includes a piezoelectric film drive for advancing the film in the camera in periodic steps; and a magnetic recording subsystem for writing information on the magnetic recording layer of the film during film advance, the magnetic recording subsystem being synchronized with the periodic steps of the piezoelectric film drive.

5 Claims, 3 Drawing Sheets

PHOTOGRAPHIC CAMERA HAVING MAGNETIC RECORDING SYNCHRONOUS WITH PIEZOELECTRIC DRIVE

FIELD OF THE INVENTION

The present invention relates to photographic apparatus and more particularly to photographic cameras capable of magnetic recording on film in the camera.

BACKGROUND OF THE INVENTION

Recently, photographic cameras employing film having a magnetic recording layer for recording information relating to photographic taking conditions, identification of the photographer, etc., have been introduced to the marketplace under the name of Advanced Photographic System (APS). See for example U.S. Pat. No. 5,130,745 issued Jul. 14, 1992 to Cloutier et al. One frequently encountered problem in such cameras is the reliability of the magnetic recording of information on the film in the camera. One approach is to translate a recording head relative to the film, while the film is stationary in the camera. This approach has the drawback of requiring additional apparatus in the camera. The other, and most commonly used approach is to employ a stationary recording head to record on the film while the film is being advanced in the camera. This approach requires some means for synchronizing the recording with the motion of the film advance system. See for example U.S. Pat. No. 5,475,455 issued Dec. 12, 1995 to Hibino et al., where the film speed encoder is employed to generate a serial data clock for synchronizing the recording of magnetic data on the film. The film speed encoders that are presently employed in APS cameras such as the Kodak model APS3600 camera monitor the passage of the film perforations for determining the film speed. Since there are only two perforations per film frame, this technique is not as reliable as would be desired. To increase the reliability of the recording, the information is recorded a minimum of three times in such cameras. There is a need therefore for an improved method and apparatus for synchronizing the recording of magnetic information with film advance in APS cameras.

SUMMARY OF THE INVENTION

According to the present invention, the above noted need is met by providing a photographic camera that includes a piezoelectric film drive for advancing the film in the camera in periodic steps; and a magnetic recording subsystem for writing information on the magnetic recording layer of the film during film advance, the magnetic recording subsystem being synchronized with the periodic steps of the piezoelectric film drive. The present invention has the advantage of achieving a higher density of recorded bits per millimeter and improving the reliability of the magnetic recording in the camera.

DETAILED DESCRIPTION OF THE INVENTION

Figure 1:
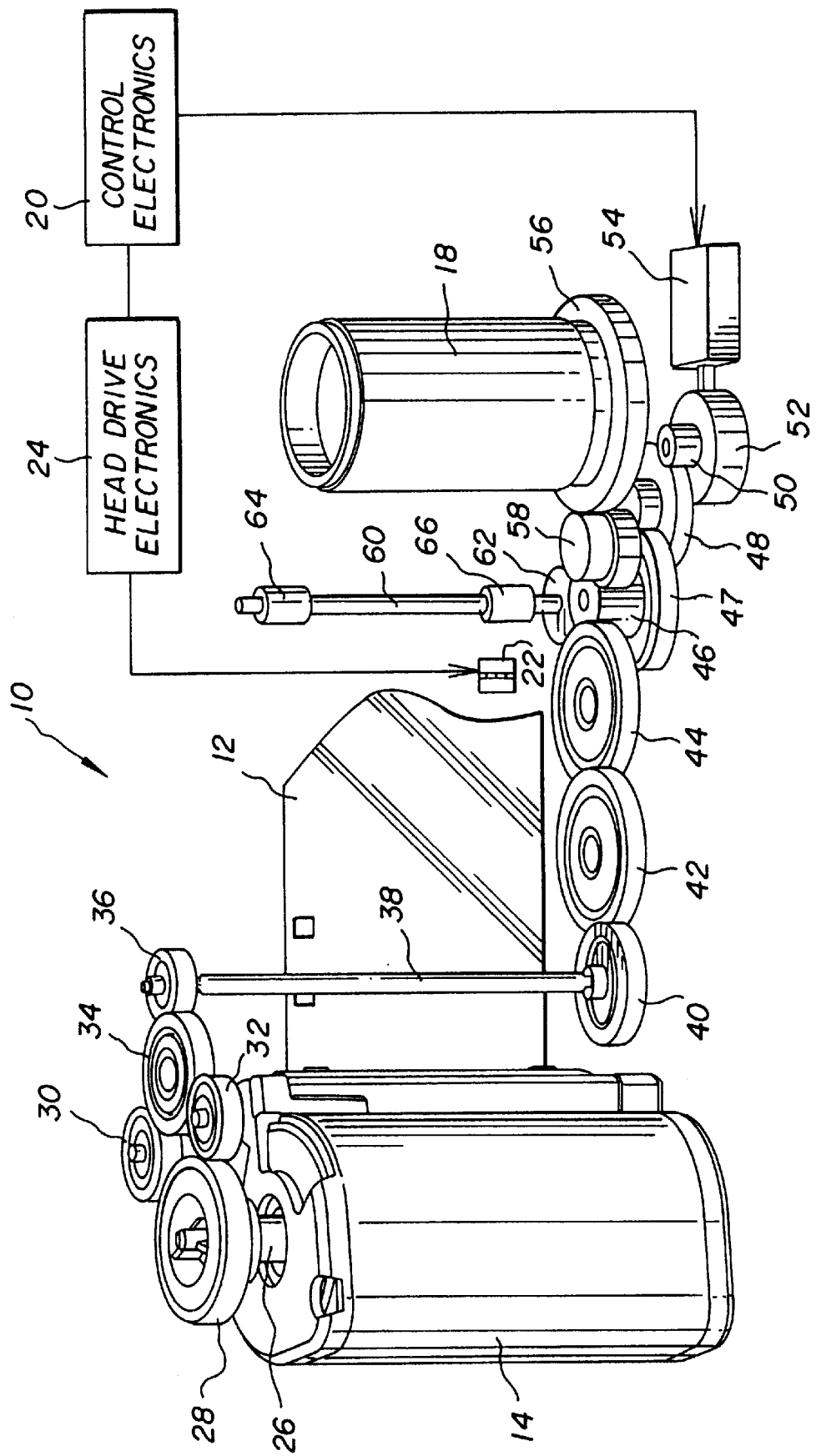
FIG. 1 is a perspective view of the film advance mechanism of a camera using a piezoelectric film drive actuator and the magnetic writing synchronization according to the present invention.

Referring first to FIG. 1, there is shown a film advance mechanism for a photographic camera according to the present invention. The film advance mechanism, generally designated 10 is in an APS camera of the type shown in U.S. Pat. No. 5,555,048, issued Sep. 10, 1996 to Oldfield. The camera uses APS film 12 having a magnetic recording layer on the back side of the film. The film is contained in an APS thrust film cartridge 14. The camera includes a taking lens (not shown) for imaging a scene onto the film and appropriate exposure control apparatus (not shown) for controlling the exposure of the film 12. The film 12 is temporarily received on a film take-up spool 18. Control electronics 20 which include a microprocessor, which receives power from a battery (not shown), controls the operation of the camera according to a program stored in a memory associated with the microprocessor.

A magnetic head 22 is located adjacent the back side of film 12 for writing on the magnetic layer on the film. Signals to the magnetic head are supplied by the control electronics 20 and are conditioned by head drive electronics 24.

The film is driven from the thrust cartridge 14 by a drive spindle 26. The drive spindle 26 is driven by a drive spindle gear 28 through a gear train that includes clutch gears 30 and 32, and transmission gears 34 and 36. Transmission gear 36 is connected to one end of a drive shaft 38, the other end of which is connected to transmission gear 40. Transmission gear 40 is driven by a gear train that includes transmission gears 42, 44, 46, 47, 48, and 50. Transmission gear 50 is connected to a film drive motor that includes a smooth drive disk 52 that is driven by a piezoelectric actuator 54. The piezoelectric actuator 54 is a piezoelectric actuator of the type manufactured by Nanomotion Ltd., Yokneam, Israel. The piezoelectric actuator 54 contacts the smooth drive disk 52 and causes the disk to rotate in a clockwise or counter clockwise direction, depending upon the phase of the drive signals supplied to the piezoelectric actuator 54. The film take up spool 18 is attached to a friction drive disk 56, which in turn is connected to the film drive transmission via a friction drive interface disk 58.

A film drive shaft 60 is driven by a gear 62 in engagement with gear 46. The film drive shaft 60 carries a pair of friction rollers 64 and 66 that are adapted to engage the film 12 to drive the film after it has been thrust into a nip formed by the friction rollers and the back of the camera (not shown).

In operation, the film drive and magnetic recording operates as follows. First, the control electronics 20 actuates the piezoelectric actuator 54 to drive the film 12 from the cartridge 14. When the film 12 reaches the nip of the film drive rollers 64 and 66, the film drive rollers overdrive the film thereby disengaging clutch gears 30 and 32 allowing the film to be driven onto the take up spool 18. The take up spool 18 is driven by a frictional drive that is sufficient to take up the film, but cannot overpower the frictional film drive rollers 64 and 66.

According to the invention, the piezoelectric actuator used to transport the film is synchronized with the magnetic writing bits to the piezoelectric drive frequency. The driving steps of the piezoelectric actuator are chosen to provide a specific film displacement. Counting these steps, the magnetic recording current is synchronized at a predetermined count for writing logic ones and writing logic zeros. In a preferred embodiment of the invention, pulse position modulation coding is used. In pulse position modulation coding, which is described in chapter 10 of the "Red Book"

System Specifications for the Advance Photo System, a bit cell is defined by periodic clock pulses of a first polarity, and a pulse of opposite polarity occurring in the first half of the bit cell represents a zero, and a pulse of opposite polarity occurring in the second half of the bit cell represents a one. The bit cell is defined by two consecutive positive current edges of the magnetic recording head. A logic zero is written in the first half of the bit cell by reversing the current through the recording head, ideally at 33% point of the bit cell position. A logic one is written in the second half of the bit cell by reversing the current through the recording head, ideally at 66% point of the bit cell position. In this example the writing of a logic one synchronized to the piezoelectric actuator driving step occurs at the step count of 33 and the writing of a logic zero occurs at the step count of 16.

Figure 2:
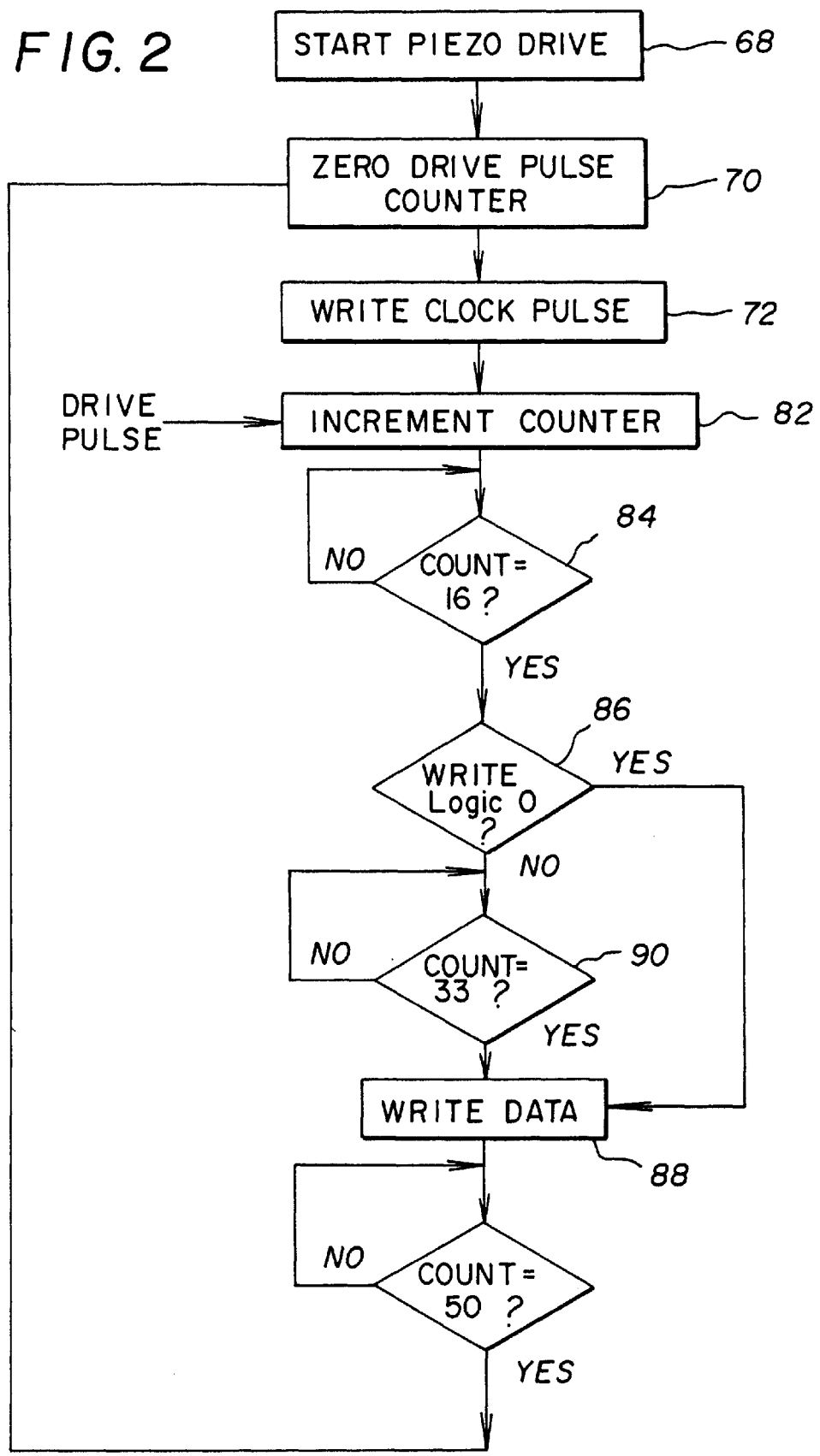
FIG. 2 is a flow chart illustrating the operation of the control logic flow shown in FIG. 1.
Figure 3:
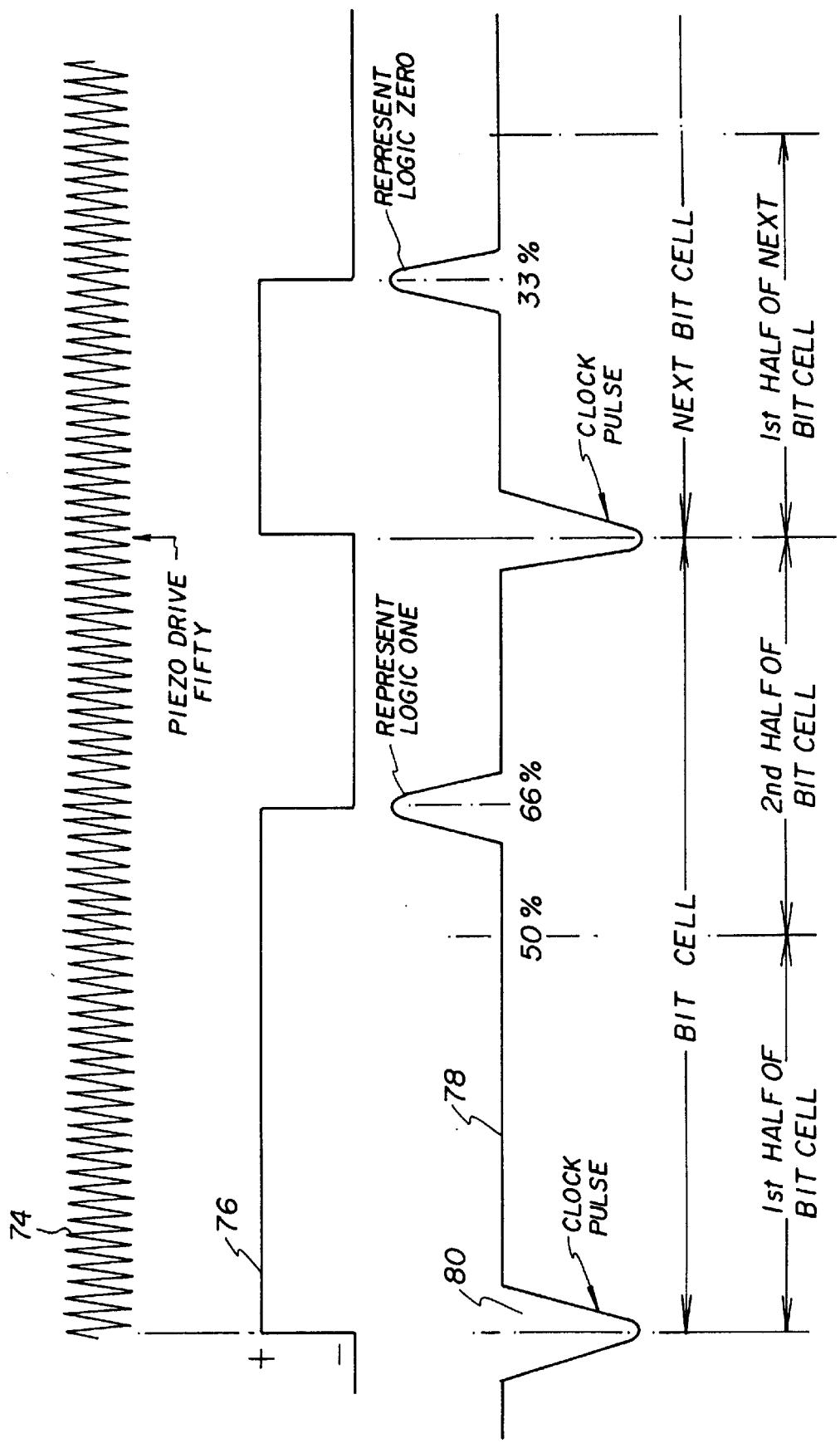
FIG. 3 is a timing diagram useful in describing the operation of the piezoelectric actuator and the magnetic writing bits synchronization according to the present invention.

Referring to FIGS. 2 and 3, the operation of the control electronics 20 will now be described. The following description only concerns the writing of magnetic data onto the film after an exposure has occurred and while the film is being transported to the next frame. It will be understood that a logic sequence for loading the film and advancing to the first frame is provided, as is a sequence for rewinding the film after all of the frames have been exposed. Referring to FIG. 2, when the piezoelectric actuator 54 is started (68) to advance the film, a step counter is zeroed (70) and a clock pulse is written (72). Referring to FIG. 3, the drive signal applied to the piezoelectric actuator 54 is shown as sinusoidal waveform 74; the current to the write head 22 is shown as waveform 76; and the response of a magnetic read head to the data recorded on the magnetic layer is shown as waveform 78. The first clock pulse is labeled 80 in FIG. 3. Returning to FIG. 2, the drive pulse counter is incremented (82) each time a drive pulse is applied to the piezoelectric actuator 54. Next, a check is made (84) for a predetermined number of counts (e.g. 16) that occurs in the first half of a bit cell (e.g. 50 drive pulses long). If the step count has reached 16, the control electronics 20 is ready to write a logic zero. A check is made (86) to see if a logical zero is to be written. If so, the magnetic head current is reversed to write a data pulse (88) representing the logic zero in the first half of the bit cell.

If a logic zero is not to be written in this bit cell, the control electronics continues to generate and count the motor drive steps (90) until it reaches a count that occurs in the second half of the bit cell (e.g. 33). At this count the magnetic head current is reversed (88) to write a logical 1. The control electronics 20 continues to count the motor drive steps until it reaches the count (e.g. 50) indicating the end of the bit cell (94). At this count the controller repeats the above described cycle to write the next data bit.

In the waveform diagram shown in FIG. 3, two bit cells are shown. A logic one is written in the first bit cell, and a logic 0 is written in the second bit cell. In a preferred embodiment of the invention, the piezoelectric actuator drives the film in steps of 0.5 microns and the magnetic recording bit rate is 25 bits per millimeter. This invention allows the recording of logic bits to be placed accurately in the bit cell, and therefore, a higher density recording (bits per millimeter) can be achieved than by the methods of the prior art.

The invention has been described in detail with particular reference to certain preferred embodiments thereof, but it will be understood that variations and modifications can be effected within the spirit and scope of the invention.

What is claimed is:

1. A photographic camera for use with photographic film of the type having a magnetic recording layer, comprising:
    a) a piezoelectric film drive for advancing the film in the camera in periodic steps; and
    b) a magnetic recording subsystem for writing information on the magnetic recording layer of the film during film advance, the magnetic recording subsystem being synchronized with the periodic steps of the piezoelectric film drive.

2. The photographic camera claimed in claim 1, wherein the magnetic recording subsystem employs pulse position modulation.

3. The photographic camera claimed in claim 1, wherein the piezoelectric film drive includes means for thrusting a film from a cartridge and means for directly driving the film after it has been thrust from the cartridge.

4. A method of controlling the writing of information on a magnetic layer of a film in a photographic camera, comprising the steps of:
    a) providing a piezoelectric film drive for the camera capable of driving the film in a series of periodic steps;
    b) advancing the film in the camera with the piezoelectric film drive; and
    c) synchronizing the writing of information on the magnetic layer with the periodic steps of the film advance.

5. The method claimed in claim 4, wherein the writing of information on the magnetic layer of the film is performed with pulse position modulation.

* * * * *